United States Patent
Hannah et al.

[11] Patent Number: 5,829,318
[45] Date of Patent: Nov. 3, 1998

[54] DYNAMIC BALANCING METHOD AND APPARATUS

[75] Inventors: R. Craig Hannah; Paul Wierzba; John P. M. Doyle; Randy W. Perusse, all of Calgary, Canada

[73] Assignee: ETI Technologies Inc., Guernsey, Channel Islands

[21] Appl. No.: 819,442

[22] Filed: Mar. 17, 1997

Related U.S. Application Data

[60] Continuation of Ser. No. 480,311, Jun. 7, 1995, abandoned, which is a division of Ser. No. 419,641, Apr. 10, 1995, which is a continuation-in-part of Ser. No. 246,864, May 20, 1994, which is a continuation-in-part of Ser. No. 66,307, May 21, 1993, Pat. No. 5,460,017, which is a continuation-in-part of Ser. No. 887,340, May 21, 1992, abandoned, which is a continuation of Ser. No. 175,320, Dec. 29, 1993.

[51] Int. Cl.$^6$ ............................................. F16F 15/22
[52] U.S. Cl. ........................ 74/573 F; 74/573 R; 74/572; 74/574
[58] Field of Search ............................... 74/572–574

[56] References Cited

U.S. PATENT DOCUMENTS

| | | |
|---|---|---|
| 1,314,005 | 8/1919 | Louden . |
| 2,103,643 | 12/1937 | Salomon . |
| 2,285,404 | 6/1942 | Best . |
| 2,331,756 | 10/1943 | Zobel . |
| 2,518,226 | 8/1950 | Drake ................................... 74/573 R |
| 2,771,240 | 11/1956 | Gurin ................................... 74/573 R |
| 2,958,165 | 11/1960 | Hoffman . |
| 2,984,094 | 5/1961 | Belaieff . |
| 3,164,413 | 1/1965 | Salathiel . |
| 3,282,127 | 11/1966 | Deakin . |
| 3,316,021 | 4/1967 | Salathiel . |
| 3,316,413 | 4/1967 | Yellott . |
| 3,339,429 | 9/1967 | Whitlock .............................. 74/573 R |
| 3,410,154 | 11/1968 | Deakin . |
| 3,415,217 | 12/1968 | McGrath .............................. 74/573 F |
| 3,433,534 | 3/1969 | Mercer . |
| 3,464,738 | 9/1969 | Pierce . |
| 3,683,216 | 8/1972 | Post ............................................ 74/572 |
| 3,696,688 | 10/1972 | Goodrich et al. . |
| 3,724,904 | 4/1973 | Nixon et al. . |
| 3,799,619 | 3/1974 | LaBarber . |
| 3,854,347 | 12/1974 | Hellerich ............................... 74/573 |
| 3,953,074 | 4/1976 | Cox . |
| 4,060,009 | 11/1977 | Wyman . |
| 4,075,909 | 2/1978 | Deakin . |
| 4,431,348 | 2/1984 | Powondra . |
| 4,433,592 | 2/1984 | Tatsumi et al. ...................... 74/573 F |
| 4,524,644 | 6/1985 | Pierrat . |
| 4,674,356 | 6/1987 | Kilgore . |
| 4,711,610 | 12/1987 | Riehl .................................... 74/573 R |
| 4,873,887 | 10/1989 | Andra et al. ......................... 74/573 F |
| 4,905,776 | 3/1990 | Beynet et al. . |
| 5,245,890 | 9/1993 | Honlinger et al. .................... 74/574 |
| 5,425,287 | 6/1995 | Beattie .................................. 74/574 |

FOREIGN PATENT DOCUMENTS

| | | |
|---|---|---|
| 202475 | 6/1975 | Argentina . |
| 1180575 | 1/1985 | Canada . |
| 0434270 | 6/1991 | European Pat. Off. . |

(List continued on next page.)

Primary Examiner—Vinh T. Luong
Attorney, Agent, or Firm—Burns, Doane, Swecker & Mathis, L.L.P.

[57] ABSTRACT

A balancing arrangement for removing imbalance in a rotatable element includes a plurality of annular races provided in an enclosing structure and a plurality of movable weights disposed in each of the races for movement within the races during rotation of the rotating member. A fluid is also disposed in each of the races. The plurality of races can include a first race having a particular cross-sectional shape and a second race having a different cross-sectional shape so that shear forces exerted on the weights in each race during rotation of the rotating member are different. The balancing arrangement can also be constructed so that the weight of the weights in one of the races is different from the weight of the weights in the other race. In addition, more than two races can be employed and the races can be disposed in a common plane or in axially displaced positions with respect to one another.

6 Claims, 16 Drawing Sheets

FOREIGN PATENT DOCUMENTS

| | | |
|---|---|---|
| 748909 | 4/1933 | France . |
| 270136 | 7/1989 | Germany . |
| 598097 | 9/1959 | Italy .................................. 74/573 F |
| 49-15266 | 2/1974 | Japan . |
| 49-15268 | 2/1974 | Japan . |
| 52-62977 | 5/1977 | Japan . |
| 52-89270 | 7/1977 | Japan . |
| 54-140064 | 10/1979 | Japan . |
| 58-37353 | 3/1983 | Japan .................................. 74/573 F |
| 60-215137 | 10/1985 | Japan . |
| 62-24053 | 2/1987 | Japan . |
| 63-259242 | 10/1988 | Japan .................................. 74/573 R |
| 2-229940 | 9/1990 | Japan . |
| 97059 | 2/1961 | Netherlands . |
| 345322 | 5/1960 | Switzerland . |
| 378068 | 7/1964 | Switzerland . |
| 938041 | 6/1982 | U.S.S.R. . |
| 1048342 | 10/1983 | U.S.S.R. .............................. 74/573 F |
| 1326817 | 7/1987 | U.S.S.R. . |
| 1401307 | 8/1988 | U.S.S.R. . |
| 1572191 | 9/1991 | U.S.S.R. . |
| 1744326 | 6/1992 | U.S.S.R. .............................. 74/573 R |
| 284234 | 6/1928 | United Kingdom . |
| 832048 | 3/1958 | United Kingdom . |
| 93/00218 | 11/1993 | WIPO .................................. 74/573 R |
| 93/23687 | 11/1993 | WIPO . |

DYNAMIC BALANCING METHOD AND APPARATUS

CROSS REFERENCE TO RELATED APPLICATIONS

This application is a continuation of U.S. patent application Ser. No. 08/480,311 filed on Jun. 7, 1995, which is a division of pending prior U.S. patent application Ser. No. 08/419,641 filed Apr. 10, 1995, which, in turn, is a continuation-in-part of pending U.S. patent application Ser. No. 08/246,864 filed May 20, 1994, which, in turn, is a continuation-in-part of pending U.S. patent application Ser. No. 08/066,307 filed May 21, 1993, now U.S. Pat. No. 5,460,017, which, in turn, is a continuation-in-part of U.S. patent application Ser. No. 07/887,340 filed May 21, 1992, now abandoned in favour of pending continuation U.S. patent application Ser. No. 08/175,320 filed Dec. 29, 1993.

INTRODUCTION

This invention relates to a balancing method and apparatus and, more particularly, to a balancing method and apparatus used for dynamically balancing an out of balance condition in a rotating body.

BACKGROUND OF THE INVENTION

Many different apparatuses for balancing an out of balance condition in a rotating body are known. Such apparatuses generally include a counterweight having a weight of a predetermined value which is located at a predetermined position from the axis of rotation to oppose an imbalance in the rotating body. The magnitude of the imbalance is generally known and, accordingly, the necessary weight and position of the counterweight can be calculated so that the weight is positioned where it will act to counter the known imbalance. These apparatuses function satisfactorily for most purposes under which they are employed but are not precise or useful enough for other applications.

Under dynamic conditions; that is, when a body is rotating about an axis and an imbalance in the rotating body develops because of external conditions or otherwise, the prior art is much less satisfactorily developed. For example, in a drill bit or in a drillstring, vibration induced forces during operation can create severe imbalances. One technique used to counteract such imbalances is disclosed in U.S. Pat. No. 4,905,776 (Beynet et al). Beynet et al teach a vibration dampening assembly with a plurality of annular grooves or races located about the periphery of the assembly and extending axially therealong. A plurality of balls or rollers are located in each of the races. Such balls or rollers are free to move along the races and thereby counteract the imbalance forces.

A further similar structure is disclosed in U.S. Pat. No. 4,674,356 (Kilgore). Kilgore teaches a plurality of balls freely movable in a race formed in an outer circumferential surface of the body which balls are used to counterbalance an imbalance in the rotating member.

There are, however, disadvantages in such prior art. Although the Beynet et al reference is satisfactory to remove large imbalances from the rotating body, it is difficult to utilise the teachings of Beynet et al where the length of the balancing apparatus is necessarily restricted which is often the case. Likewise, while the teachings of Beynet et al are satisfactory to generally remove large imbalances from the drillstring, there is no provision therein for removing all or most of the remaining imbalance thereafter, particularly the imbalance that may remain when the balls in the races of Beynet et al are located at their optimum positions in the races to counteract the imbalance.

This latter problem is also inherent in the above mentioned Kilgore reference. Kilgore teaches two counterbalance structures, one located at each end of a shaft, to offset the imbalance in the shaft or the imbalanced forces in the rotating structure which is movable with the shaft. If the balls are not located at their optimum positions, the imbalance in the shaft will not be removed.

The dynamics of weight movement in the various races of the balancing apparatus is an important consideration for efficient movement of the weights in order for the weights to properly "set up" and remove imbalances under various operating conditions. Such conditions may include the acceleration of a rotating apparatus from zero to some predetermined steady-state operating speed or revolutions (r.p.m.'s), the operation of a machine between two natural modes of vibration which are inherent in a particular system and the operation of a machine or apparatus that is subjected to additional non-one time per revolution excitations; that is, forces which are applied to the apparatus with frequencies different from the rotational speed of the apparatus.

In a single race with movable weights, many of the weights in the race tend to respond to the varying operating conditions in a similar general fashion in view of the similar masses and sizes of the movable weights. In addition, the weights will often contact each other and interference with the independent movement of the individual weights results. This can lead to a case wherein an imbalance condition is not removed or substantially removed. However, with more than one race, each race having a plurality of weights, the movement of the weights in each race is independent from the weights of the other race and, accordingly, each plurality of weights responds to varying operating conditions in a different manner. This is beneficial because if the movable weights in the first race respond inappropriately to remove an imbalance, such as drifting away from their optimal desired position, the movable weights in the second race may respond appropriately and may also tend to influence, compensate for, or terminate the inappropriate behaviour of the movable weights in the first race. These phenomena in two race and greater apparatuses are referred to as "race for race" compensation.

The independent movement of the weights at different times is under the influence of several variables. Some such variables include the material of the weights and races, the configuration of the weights and races, the size of the weights and races, the diameter of the various races and the presence or absence of fluids in the various races. If there are fluids present, then the viscosities of the fluids used are of particular importance.

The independence of the movement of movable masses can be established by varying the dynamics of the individual races. The dynamics of the weight or ball movement in a manner different than having balls of different sizes in different grooves is of importance. It has been found that, with other factors being equal, balls made from a denser material will respond faster to imbalance than lighter balls. This faster response of the weights or balls may be implemented by manufacturing the movable weights from a material such as carbide material, which is denser than the density of known steel material. It is also noted that earlier movement of the balls can result if the weights are made of hard material and are therefore able to move more freely. Likewise, it is noted that earlier movement of the weights or balls can be achieved if the races in which the weights move are of a relatively hard material.

A further parameter affecting the movement of the weights within the races is the presence or absence of fluid and the viscosity of such fluid. More particularly and with other factors being equal, the use of a fluid with a greater viscosity will delay the movement of the balls or weights in the race while the presence of a fluid having a lesser viscosity will allow the movement of the weights to take place more readily. Thus, if there are a plurality of races, the use of different fluids in different races will allow the movement of the weights in each race to take place at a predetermined rate which may be useful in certain applications.

For example and, again, other factors being equal, if there are two races with the same size weights in each race, the use of a fluid with a first viscosity in the first race and a fluid with a second viscosity in a second race, the viscosities of the two fluids being different, the weights in the second race with the fluid of the second race having a higher viscosity will, upon startup, move and "set-up" earlier to remove the imbalance than the balls or weights in the first race. Conversely, the higher viscosity fluid will tend to delay the movement of the weights or balls at operating speeds when the balls are already "set-up" to remove an initial imbalance and a further imbalance appears in the apparatus. Thus, depending on the operating characteristics desired, a fluid of a first viscosity can be used to enhance "set-up" at low speeds and a fluid of a second viscosity can be used to enhance "set-up" at higher speeds. In this manner, it is possible to design a system which will set up to remove the imbalance at a predetermined time, predetermined speed of angular rotation, or predetermined angular acceleration of the member. And, while a system using two races has been described, it is contemplated than different fluids could be used in each race of a balancing apparatus, wherein the apparatus has three or more races.

It is again emphasized that the explanations given herein are believed to be correct based on empirical and calculated results and laboratory simulations. However, subsequent investigations may well reveal that these explanations will be modified and such explanations are given here for the purpose of full disclosure of the technology which is sought to be protected.

SUMMARY OF THE INVENTION

According to one aspect of the invention, there is provided a balancing apparatus to remove imbalance in a rotating body comprising a first plurality of weights movable within a first circular race, a second plurality of weights movable within a second circular race, said first circular race further including a first fluid with a first viscosity, said second circular race further including a second fluid with a second viscosity, said viscosity of said second fluid being different from said viscosity of said first fluid.

According to a further aspect of the invention, there is provided a balancing apparatus comprising a first circular race rotatable about a first axis, a first plurality of weights movable within said first race, a locking member operable to maintain said first plurality of weights in a first position reached at a first predetermined angular velocity and to release said first plurality of weights from said first position at a second predetermined angular velocity.

According to yet a further aspect of the invention there is provided a method of removing the imbalance from a rotating apparatus comprising increasing the rotation speed of said apparatus until a first predetermined rotation speed is reached, maintaining a plurality of movable weights in a first race in a first position of said weights which is reached at a first predetermined rotation speed, increasing said rotation speed of said apparatus to a second predetermined rotation speed and releasing said plurality of movable weights from said maintained position at said second predetermined rotation speed.

According to yet a further aspect of the invention, there is provided a balancing apparatus to removed imbalance in a rotating body comprising a first plurality of weights in a first race, said first race having a first configuration and a second plurality of weights in a second race, said second race having a second configuration, said configuration of said first race being different from said configuration of said second race.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 3:
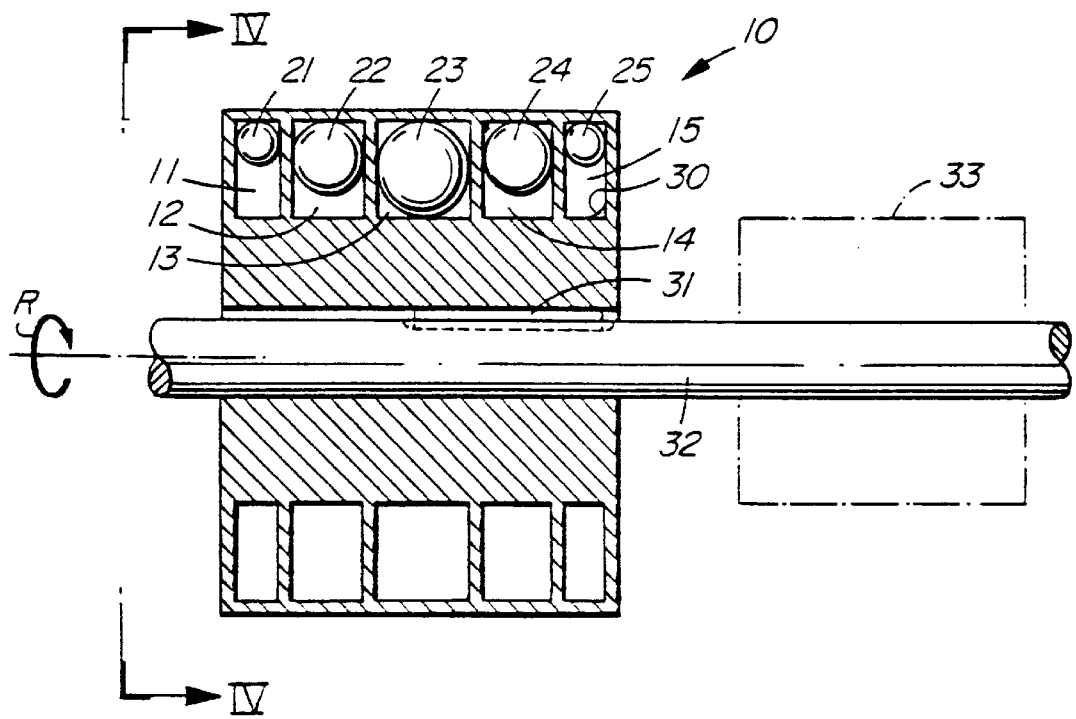
FIG. 3 is a side sectional diagrammatic view of a second embodiment of the counterbalancing apparatus according to the invention.

Referring now to the drawings, a counterbalancing apparatus according to the invention is illustrated generally at 10 in FIG. 3. It comprises a first set of annular races or grooves 11, 12, 13, 14, 15, it being understood that oppositely located races 11, 15 are conveniently identical and that oppositely located races 12, 14 are also conveniently identical. It will be understood that the term "race" or "races" refers to the physical boundary within which the weights move during operation or, alternatively, it could also include a pathway which acts to guide weights movable thereon or therein as described in greater detail below.

A plurality of weights 21, 22, 23, 24, 25, conveniently spherical in the form of balls, are mounted in the races 11, 12, 13, 14, 15, respectively. The plurality of weights in each of the races are conveniently all the same size and weight; that is, the weights 21 in race 11 are all the same size and weight, the weights 22 in race 12 are all the same size and weight and so on. It is important, however, that the weights in at least two of the races be different in size and weight; that is, the weights 23 in race 13 are preferably larger and heavier than the weights 24 in race 14. It will be further understood that the term "weights" may include a variety of different shapes such as spherical, disc or cylindrically shaped weights which are movable within the races or guided thereby. The term may also include weights of different configuration as is described further in this specification.

The balls 21, 22, 23, 24, 25 are freely movable in their respective races 11, 12, 13, 14, 15 about the circumference of the counterbalancing apparatus 10. An appropriate lubricant 30, conveniently silicon, is added to the counterbalancing apparatus 10 in order to reduce the friction between the balls and their respective races or grooves, to also reduce the noise made by the balls when the counterbalancing apparatus is in operation, and to create an appropriate amount of viscous dampening to the balls as will be described hereafter.

The balls 21, 22, 23, 24, 25 may be manufactured from a hardened material. Likewise, the races or grooves 11, 12, 13, 14, 15 may be hardened. The hardening is desirable in order to prevent the formation of "flats" on the balls or races which tend to reduce the ability of the balls to move freely within the grooves or races and thereby retard the effectiveness of the counterbalancing movement of the balls.

OPERATION

In operation, the counterbalancing apparatus 10 is installed on shaft 32 so as to fixedly rotate therewith such as by using a key 31 between the apparatus 10 and the shaft 32. The operation of an imbalanced member generally illustrated at 33, which creates an out of balance condition, is initiated and shaft 32 rotates with member 33 and counterbalancing apparatus 10 as illustrated.

As an out of balance condition originates within member 33, the balls 21, 22, 23, 24, 25 in each of the races 11, 12, 13, 14, 15 move and act to counterbalance the out of balance condition.

It is difficult to precisely state all the principles by which the balls are known to move and while it is believed that empirical data will subsequently lead to formulae and better understanding to predict the optimal behaviour of the counterbalancing apparatus 10, the following explanation is given with the expectation that further information presently not known will amplify, modify or change such explanation.

It is believed that the larger balls 23 in race 13 will remove the larger out of balance condition in member 33. The somewhat smaller balls 22, 24 in races 12, 14 will act to remove the somewhat smaller out of balance condition in member 33. Finally, the smallest balls 21, 25 in races 11, 15 will act to remove the smallest out of balance condition in member 33. Thus, the entire out of balance condition in member 33 is removed by "fine tuning"; that is, by removing the imbalance under dynamic conditions with a plurality of different sized balls positioned in separate races which balls optimally remove different degrees of imbalance.

Figure 4:
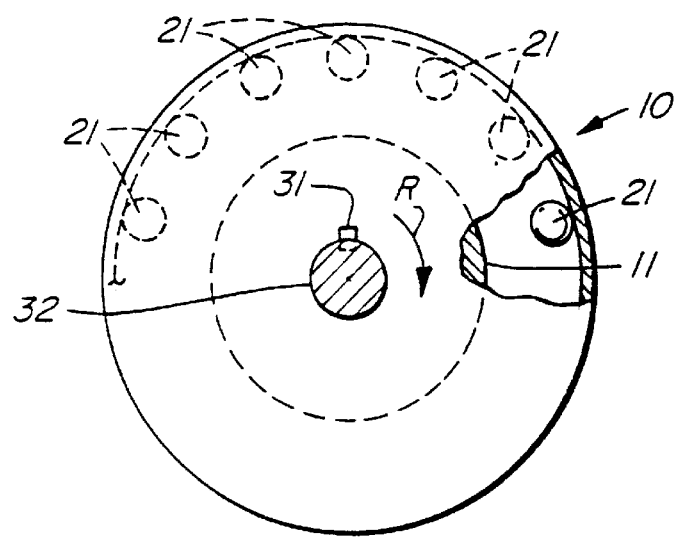
FIG. 4 is an end view taken along IV—IV of FIG. 3.

With reference to FIG. 4 which illustrates the leftmost race 11 of FIG. 3 with the balls 21 in a representative and dynamic balanced position offsetting the imbalance in member 33, as viewed with a timing light adjusted for appropriate shaft r.p.m., it has been found that the optimum behaviour for the balls 21 occurs when they do not contact each other in the dynamically balanced position as is illustrated. It has been found that when many of the balls 21 come into contact with each other, the balancing phenomenon is not optimal and modification of the counterbalancing apparatus 10 may be necessary by way of structural or weight changes.

The embodiment of the invention illustrated in FIGS. 3 and 4 is conveniently used when there is a large potential imbalance problem in member 33 under dynamic operating conditions. If the potential imbalance problem in member 33 is small, the number of races and associated balls therein can be reduced to as few as two (2), with all of the balls in each respective race being the same size and weight and the balls of the first race being different in size and weight from the balls of the second race, the former balls being larger and acting to remove the large imbalance and the latter balls being smaller and acting to remove the smaller remaining imbalance.

Figure 1:
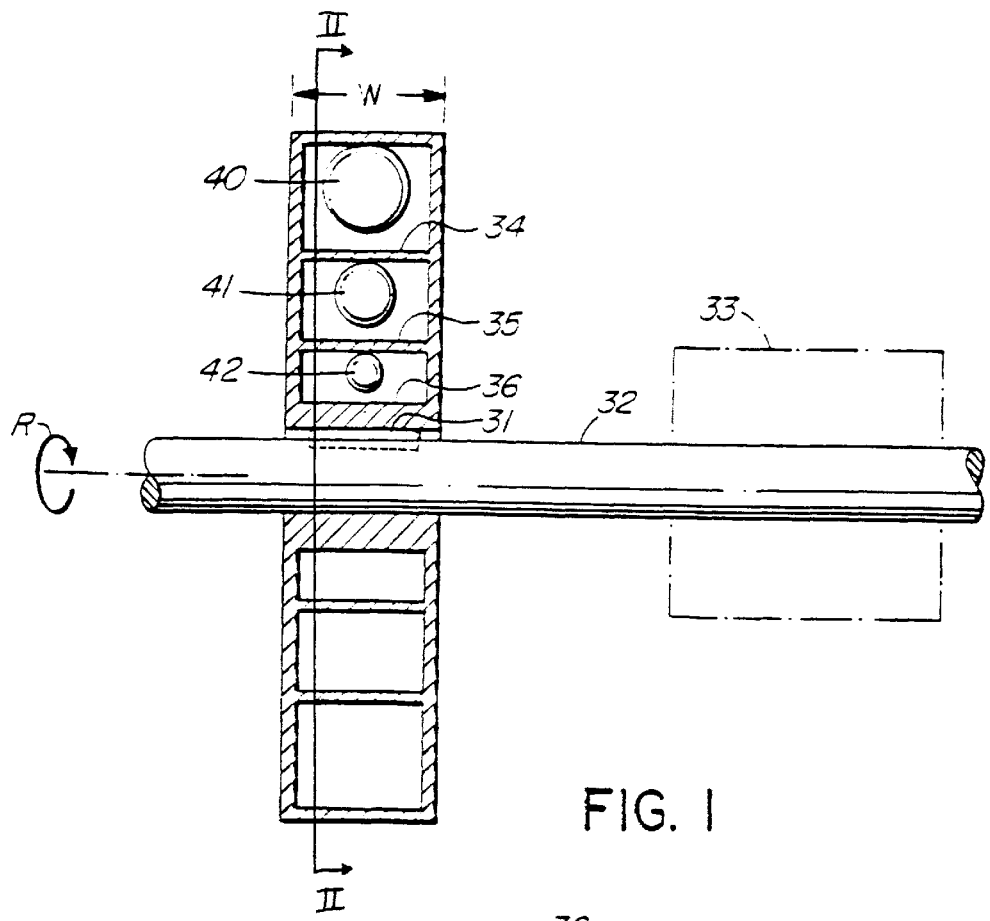
FIG. 1 is a side sectional diagrammatic view of a first embodiment of the counterbalancing apparatus according to the invention.
Figure 2:
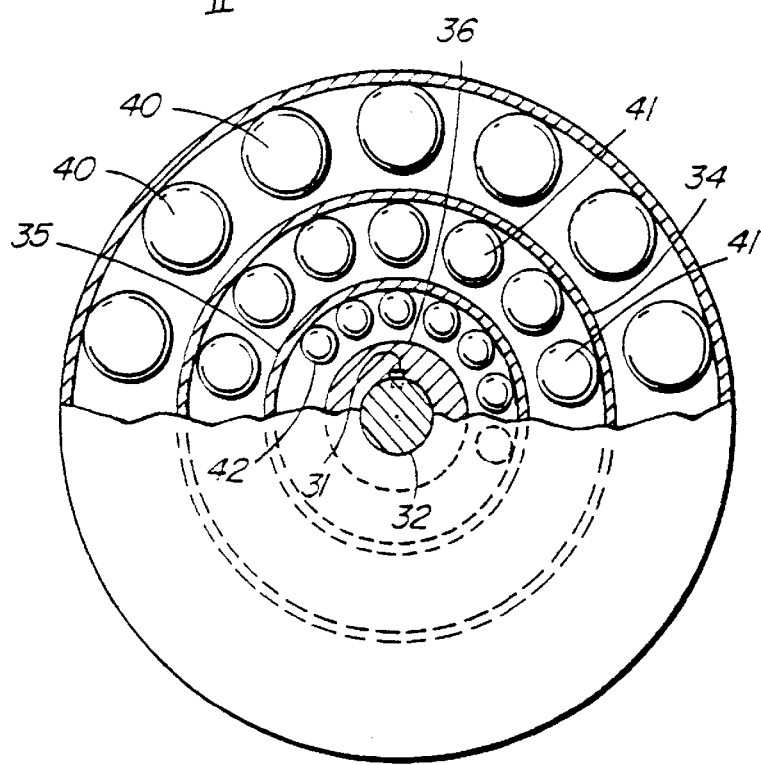
FIG. 2 is a cross-sectional view taken along II—II of FIG. 1.

Referring now to FIGS. 1 and 2, there is illustrated a further embodiment which is desirably used when the width "W" as illustrated in FIG. 1 is limited. In this embodiment, there are three grooves or races 34, 35, 36 with balls 40, 41, 42 mounted therein, respectively. The balls 40 in race 34 are all the same size and weight. The balls 41 in race 35 are likewise all the same size and weight and the balls 42 in race 36 are likewise all the same size and weight. The balls 40 in race 34, however, are larger and heavier than the balls 41 in race 35 which, in turn, are larger and heavier than the balls 42 in race 36. Under operating conditions and when an imbalance occurs in member 33 during rotation of shaft 32, the balls 40, 41, 42 will assume positions which counter the imbalance. A representative view of the positions of balls 40, 41, 42 illustrated in FIG. 2 would be positions where the imbalance is removed optimally; that is, and as earlier described, the balls in each race or groove do not contact each other.

Figure 5:
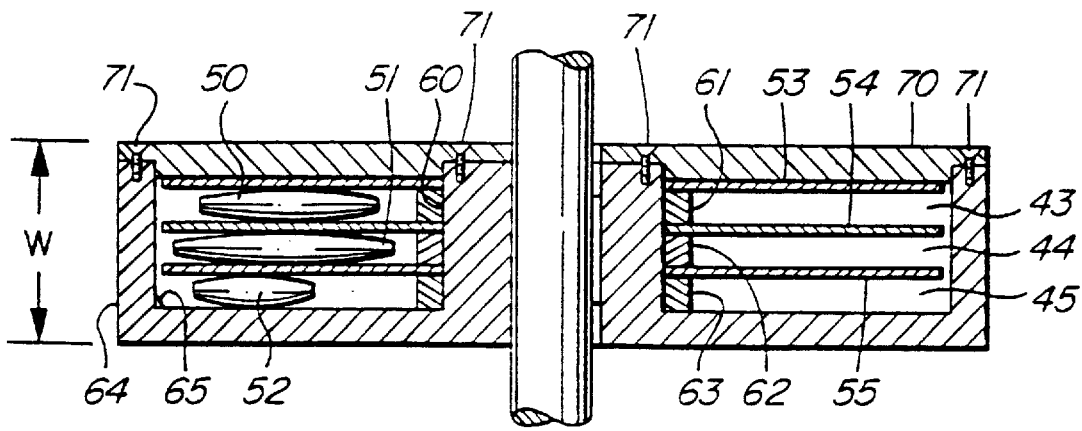
FIG. 5 is side sectional view of a further embodiment of the counterbalancing apparatus according to the invention.

A further embodiment of the invention is illustrated in FIG. 5. In this embodiment, wherein the width "W" is again of concern, a first plurality of cylindrical disc-like weights 50, 51, 52 are positioned to be freely movable in each of the races 43, 44, 45 which races 43, 44, 45 are formed by circumferential dividers 53, 54, 55 which are positioned over hub 60 and between spacers 61, 62, 63. A silicon lubricant 65 is added to the interior of the housing 64 and a closure member 70 is connected to the housing 64 by the use of cap screws 71.

In operation, the housing 64 is fixedly mounted on the rotating shaft 32 as described in association with the method of FIG. 1. As an imbalance arises in member 33, the cylindrical weights 50, 51, 52 will freely move within the races 43, 44, 45 until they assume a position wherein they counterbalance the imbalance occurring in the member 33. It has been found that it is preferable to give the sides of the cylindrical disks 50, 51, 52 a slight bow in order that the discs 50, 51, 52 contact the dividers 53, 54, 55 with a minimal surface area wherein they are not influenced by any possible suction which might otherwise occur between the dividers 53, 54, 55, the silicon lubricant 65 used and the discs 50, 51, 52 of the FIG. 5 embodiment. It is preferable that the cylinders or discs 50, 51, 52 move as freely as possible within the races 43, 44, 45 between the dividers 53, 54, 55 as is likewise true for the weights and balls of the FIGS. 1 and 3 embodiments.

Figure 6:
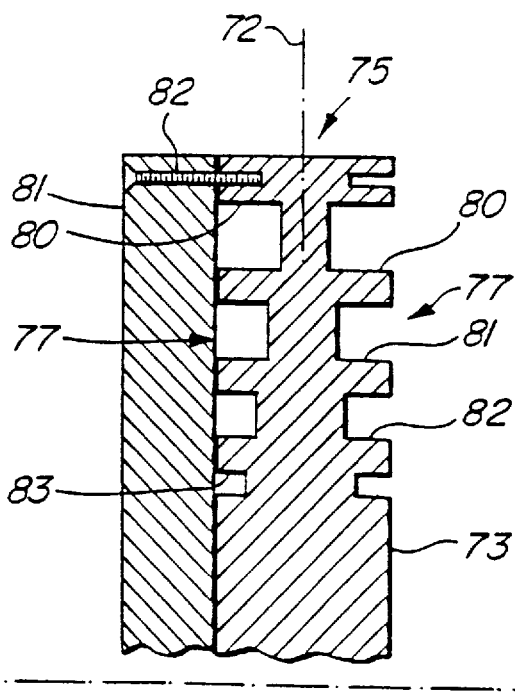
FIG. 6 is a side sectional diagrammatic view of a further embodiment of the counterbalancing apparatus according to the invention.
Figure 7:
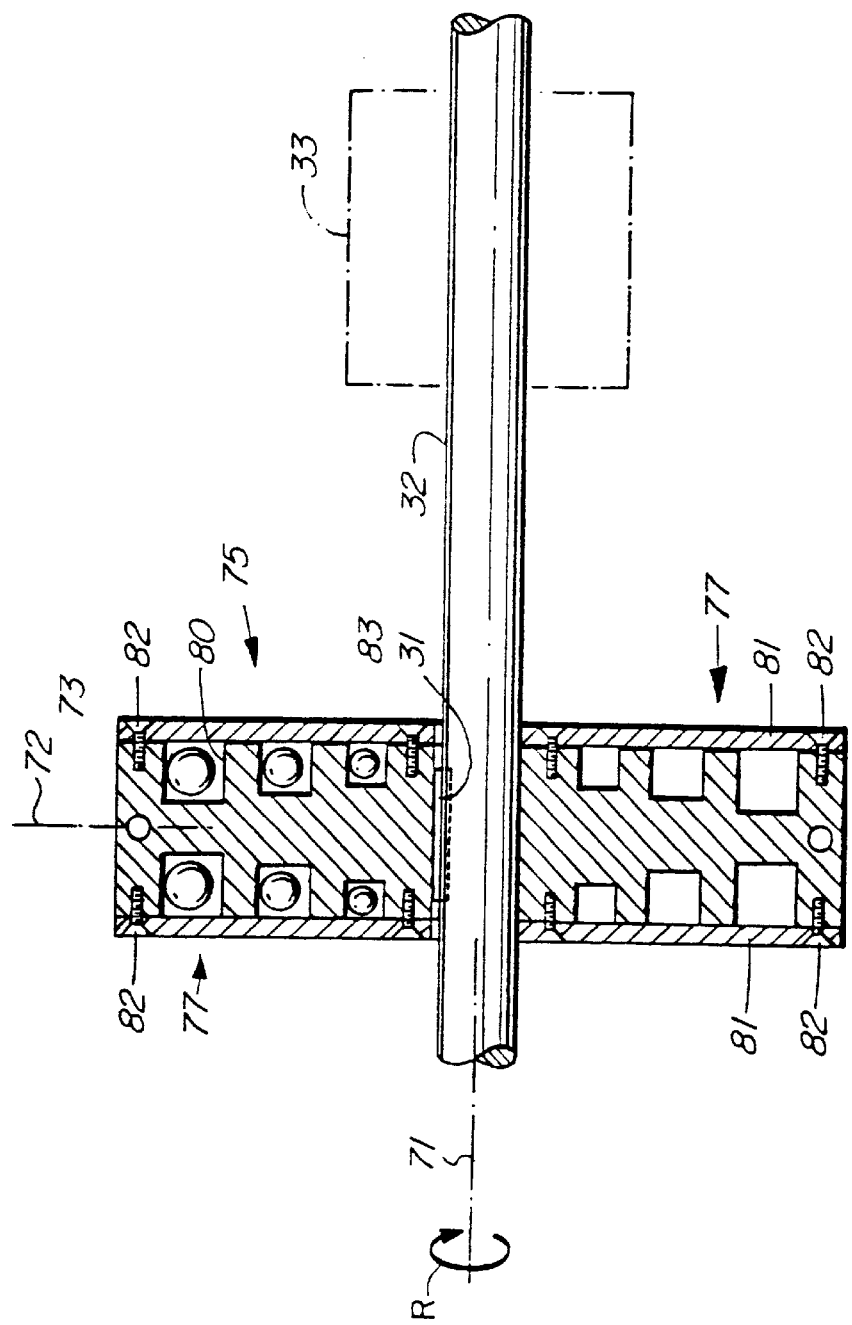
FIG. 7 is a side sectional diagrammatic view of the apparatus of FIG. 6 illustrated in its operating position.

Yet a further embodiment of the invention is illustrated in FIGS. 6 and 7, FIG. 6 illustrating four (4) grooves or races and FIG. 7 illustrating only three (3) grooves or races. In this embodiment, the counterbalancing apparatus generally illustrated at 75 is symmetrical about both axes 76, 72 and is mounted to a shaft 32 similar to the FIG. 1 embodiment.

In this embodiment, however, a central circumferential member 73 made from a solid piece of material is machined with a plurality of annular races generally illustrated at 77 on both faces. Balls are mounted in the races 80, 81, 82, 83, the balls mounted in the outermost race 80 being the largest and the balls in the innermost race 83 being the smallest. After providing the silicon lubricant within each of the races 77, two end plates 85 are mounted to the central circumferential member 73 by the use of cap screws 82. The operation is similar to the operation of the FIG. 3 embodiment; that is, when an imbalance occurs in member 33, the balls in each race will assume a position wherein the imbalance is removed.

It is not again presently known why such is the case, but it has been found that seven (7) balls or weights in each race or annular space of each of the embodiments appear to be an optimal number. It is, however, also believed that a greater or smaller number of balls or weights would usefully serve to remove various imbalances under various operating conditions.

Figure 8A:
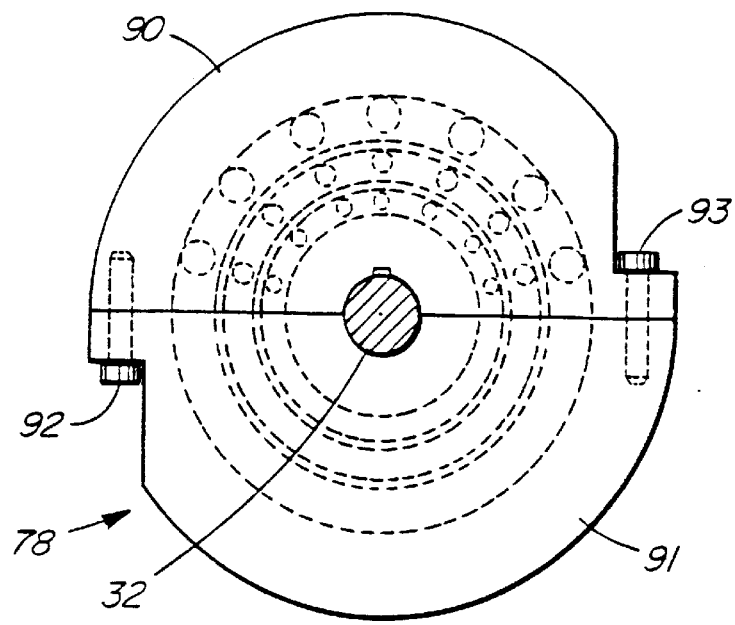
FIGS. 8A and 8B are end views of a further embodiment of the invention mounted about a shaft and illustrating the counterbalancing apparatus in assembled and disassembled condition about the shaft, respectively.
Figure 8B:
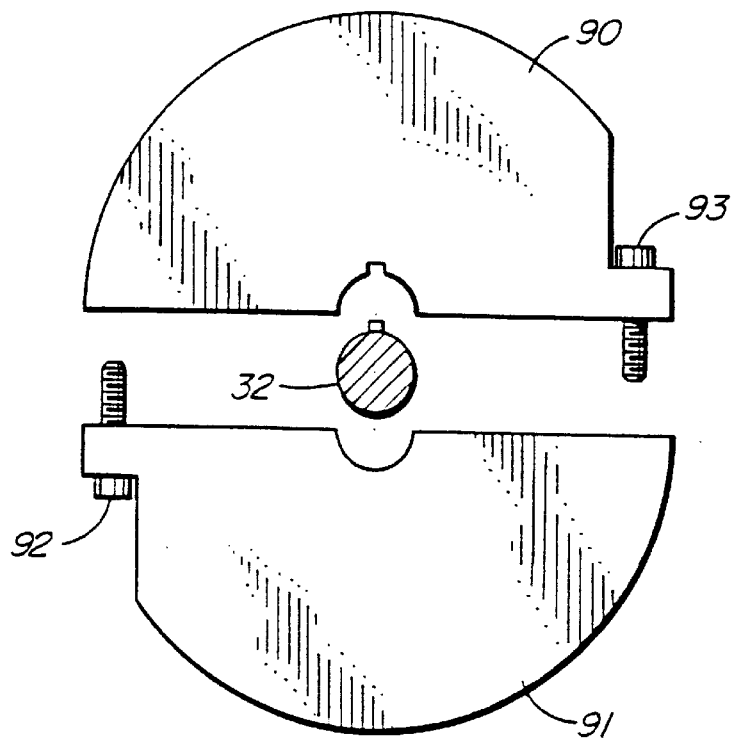

A further embodiment of the invention is illustrated in FIGS. 8A and 8B. In this embodiment, the counterbalancing apparatus 78 according to the invention is illustrated as being made from two sections 90, 91, which sections are mounted about shaft 32 by cap screws 92, 93 and which sections 90, 91 are freely removed from shaft 32 by removing the cap screws 92, 93. This embodiment is particularly useful where minimal modifications are desirably made to the rotating shaft 32 or to the out of balance member 33 (FIG. 1). Rather, the counterbalancing apparatus 78 is simply connected to the shaft 32 at a position where it is possible so to attach the counterbalancing apparatus 78 and the cap screws 92, 93 are tightened to firmly couple the apparatus 78 to the shaft 32.

Figure 9:
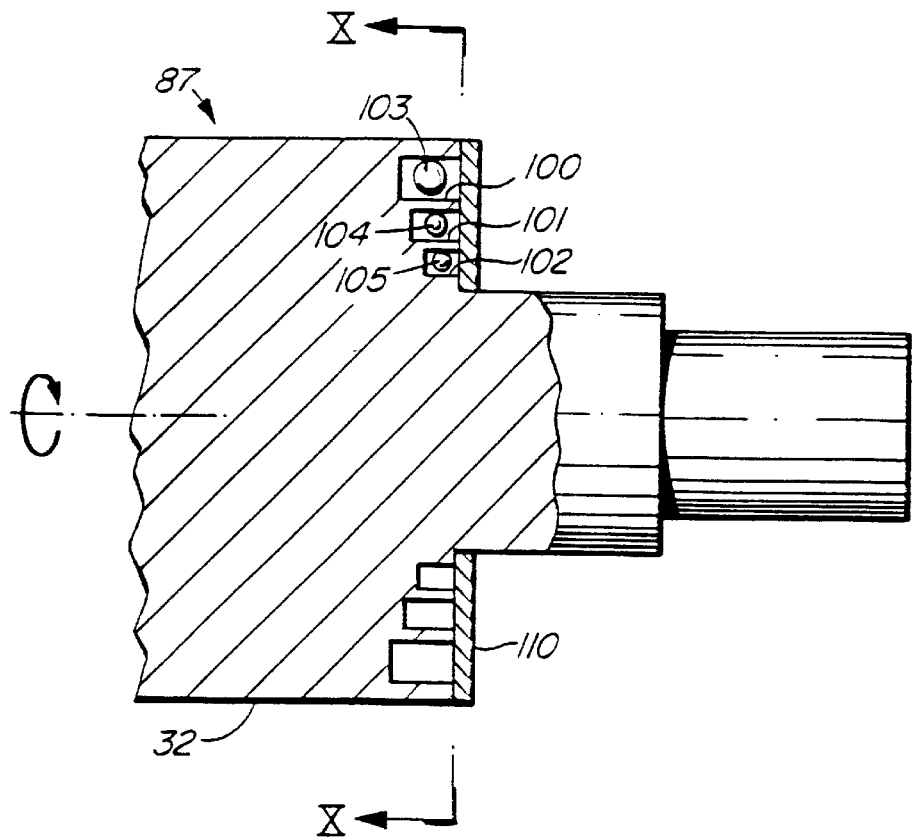
FIG. 9 is a diagrammatic side view of yet a further embodiment, the counterbalancing apparatus according to the invention being operably located within a shaft.
Figure 10:
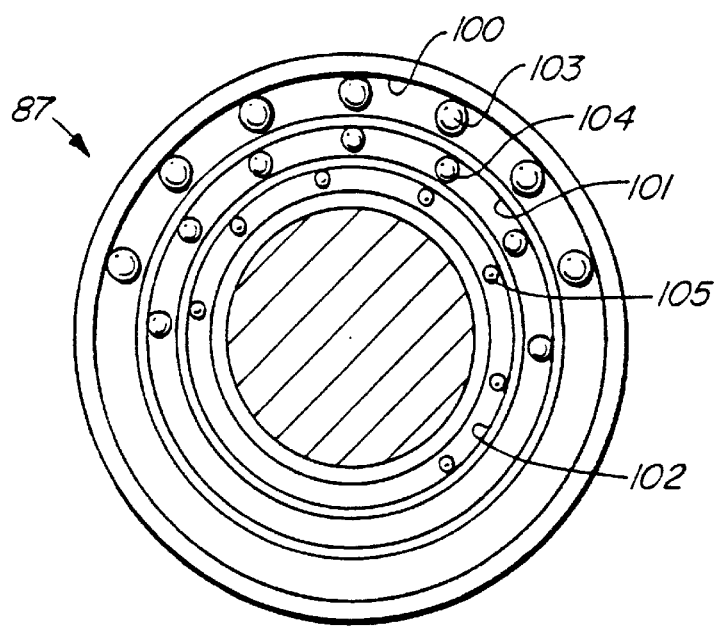
FIG. 10 is a diagrammatic end view taken along X—X of FIG. 9 illustrating a representative position of the movable weights during rotation of the shaft in which the apparatus is located.

Yet a further embodiment is illustrated in FIGS. 9 and 10. In this embodiment, it is contemplated that the counterbalancing apparatus 87 is mounted inside the outer circumference of a rotating shaft 32. As illustrated in FIG. 9, the grooves or races 100, 101, 102 are machined directly into the solid material of shaft 32 and the balls 103, 104, 105 are positioned directly therein for free movement relative thereto. A cover 110 is connected to the shaft 32 and the balls 103, 104, 105 are thereby retained. In operation, as an out of balance condition occurs either in the out of balance member 33 (FIG. 1) or in shaft 32 itself, the balls 103, 104, 105 will orient themselves in a configuration such as the configuration illustrated in FIG. 10. In such positions, the shaft 32 and/or the imbalanced member 33 is balanced by the position of the balls 103, 104, 105 under dynamic operation conditions.

It has been found that under certain conditions and particularly at lower r.p.m.'s of the counterbalancing apparatus 10, the weights 21 (FIG. 11) will tend to remain in a substantially stationary position in the race 11 until the revolutions per minute of the counterbalancing apparatus increase to the point where the weight 21 is carried around the outermost point of the inside diameter of the race 11 or from one side of the radial 25 to the other or until the centrifugal force acting on the weights forces them outwardly until they are in an operating engagement with the outer surface of the race 11 which will then exert a certain friction force that will tend to carry them around with the race 11. After operating speed occurs, the weights 21 will then quickly rearrange themselves with minimal movement so as to properly balance any imbalance condition. It has been found, for example, that at higher rotational speeds of the balancing device, the weights 21 within the races will quickly rearrange themselves to set off any imbalance in the device. However, at lower speeds, this not always the case and, accordingly, it is convenient to utilise means to move the weights with the race or, at least, to provide a force on the movable weights which will tend to move the weight with the race as it rotates about its axis.

Any delay in removing the imbalance is not advantageous since if a shaft, for example, being in balance and rotating, suddenly encounters an out-of-balance condition, it is conceivable that the weights 21 may not move quickly enough to remove the out-of-balance condition before damage results to the system.

The means used to improve the "quickness" with which the system responds to remove the out-of-balance condition can take several forms. It is, for example, contemplated that a substance could be added to the races 11 so that a force is imparted to the weights 21 which force will be such that the weights 21 will move from a stationary position as indicated to a position "over-the-top" of the member 10 and from one side of the radial 25 extending from the axis 26 of the member 10 to the opposite side. Alternatively, mechanical or electrical means could be used.

Figure 11:
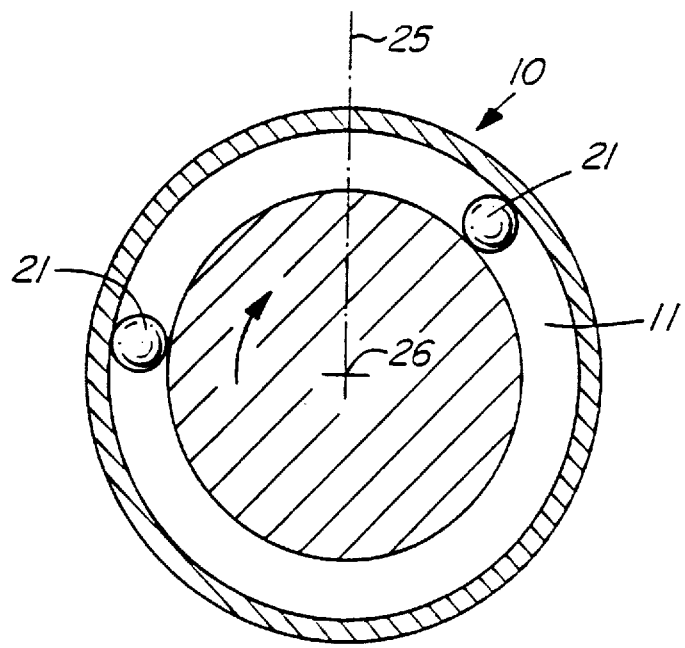
FIG. 11 is a view of the counterbalancing apparatus according to the invention illustrating the vertical radial from the axis of the apparatus.

With reference to FIG. 11, it is contemplated that the initial movement of the weights 21 within the race 11 may occur by the addition of a substance to the races 11 that will initially give a degree of force to the weight so that the movement of the weights 21 is initiated by the substance. For example, such a substance could be a fluid of a consistency to impart the rotational movement to the weights, such as grease. An exhaustive list of all such substances is not immediately contemplated but such a list might include virtually any substance to initiate movement of the weights 21. Even sand is contemplated as such a substance but, of course, sand may be inappropriate because of contamination and eventual binding of the weights 21 within the race 11 which would affect normal operation where quickness of weight movement may not be necessary.

It is also contemplated that the initial weight movement could be initiated externally of the counterbalancing apparatus 10. For example, if the weights 21 were made of a magnetic material, an external probe (not illustrated) could apply a suitable magnetic field to the weights 21 which would allow the weights 21 to immediately commence movement in the event an imbalanced condition is encountered. This would be intended to reduce the rotation time of the weights 21 so that the imbalanced condition can be removed and would thereby reduce the chance of damage to the out-of-balance apparatus.

Figure 12:
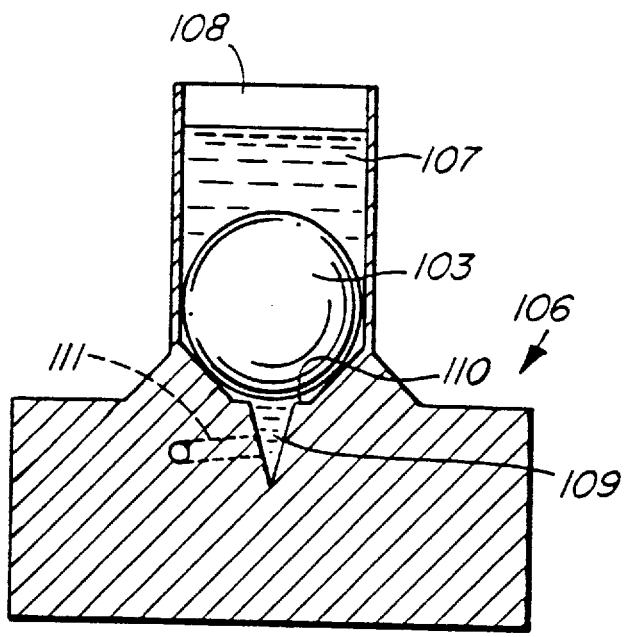
FIG. 12 is a diagrammatic cross-sectional view of a ball retaining apparatus according to a further embodiment of the invention.

Reference is made to FIG. 12 which illustrates the balancing device generally illustrated at 106. A liquid 107 is added to the balancing device 106 and takes a level 108 above the movable weight in the form of ball 103. A V-shaped race 109 is formed in race 110 in which ball 103 is intended to move. The V-shaped race 109 has a plurality of passages 111 which extend from the race 109 to a liquid reservoir (not illustrated).

In operation and when the balancing device 106 begins to rotate, the liquid 107 will tend to rotate with the race 110 and, therefore, will exert a force on ball 103 which tend to rotate the ball 103 with the race 110. As the speed of rotation of the balancing device increases, the centrifugal force on the liquid will increase and, therefore, there will be a tendency for the liquid 107 to exit through passageway 111 and thereby to terminate any further influence over the movement of ball 103 which, by that time, will be rotating at the same speed as the balancing device 106. This is beneficial for the previously mentioned reasons, namely that if the balls 103 move quickly at speed, any imbalance arising will be quickly corrected.

Figure 13:
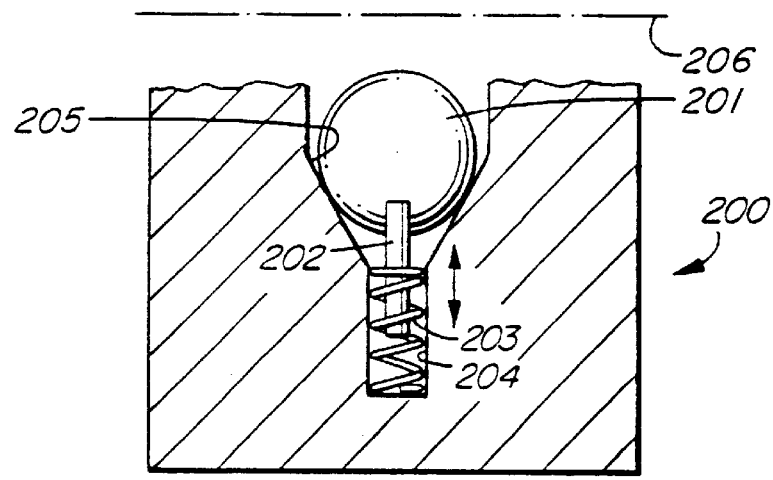
FIG. 13 is a diagrammatic cross-sectional view of a ball retaining pin apparatus according to a further embodiment of the invention.

A further embodiment of the invention is made with reference to FIG. 13. The balancing device generally illustrated at 200 includes a movable weight in the form of a ball 201 and includes a pin 202 which is spring mounted within a radially outwardly extending opening 204. A compression spring 203 acts on the pin 202 to force it inwardly to the position indicated and thereby restrains movement of the ball 201 upon initial rotation of the balancing device about axis 206.

As the balancing device 200 commences to rotate about axis 206, the pin 202, in the position illustrated, will cause the ball 201 to rotate with the race 205. The speed will increase and as it does so, the centrifugal force acting on the pin 202 will tend to move the pin 202 outwardly from axis 206 in opening 204 thereby allowing the ball 201 to move in the race 205 thereby to freely assume any position to correct an imbalance in the rotating machinery to which the balancing device 200 is attached.

Figure 14:
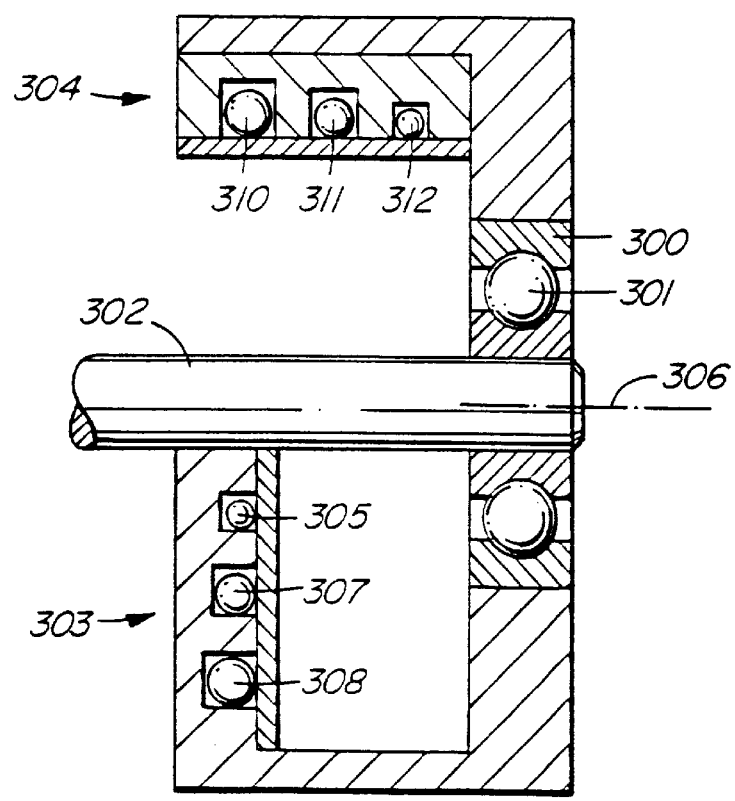
FIG. 14 is a cross-sectional view of two versions of balancing devices according to the invention, either of which might be used with an ordinary ball bearings.

Reference is now made to FIG. 14 which diagrammatically illustrates two embodiments of the invention which may be used with a bearing 300 having standard balls 301 mounted so as to allow rotation of shaft 302 with reduced friction. However, it is desirable to remove imbalances in the shaft 302 and, to that end, a balancing device 303 or a balancing device 304 may be added.

Balancing device 303 is connected so that it rotates with the shaft 302 and the movable weights in the form of balls 305, 307, 308 move about axis 306 of shaft 302 in races which are positioned concentrically and outwardly in a plane transverse to the direction of axis 306 and, in balancing device 304, the weights in the form of balls 310, 311, 312 rotate in races which are longitudinally spaced and coaxial to shaft 32.

The balls 305, 307, 308 are of different diameters and this applies likewise to the diameter of balls 310, 311, 312. Either configuration may be useful depending upon the geometrical considerations present in the system which is being used which includes shaft 302 and bearing 300.

Figure 15A:
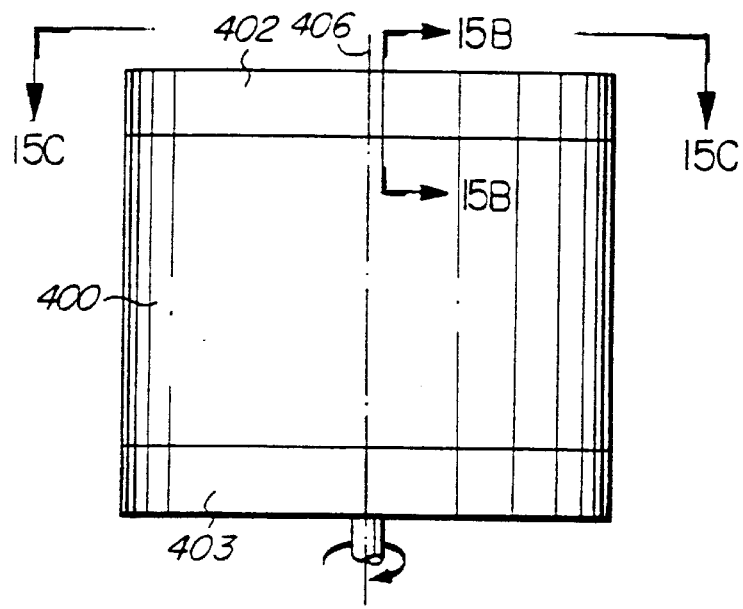
FIG. 15A is a diagrammatic view of the outside of the tub of a washing machine with balancing devices mounted thereon.

Reference is now made to FIG. 15A which illustrates the clothes containing cylinder or "spin basket" 400 of an ordinary washing machine rotatable about the axis of rotation 406. Two balancing devices 402, 403 are connected to the basket 400 to remove any imbalance upon operation although one, of course, may be sufficient to remove imbalances. The balancing devices 402, 403 may again take two different forms.

Figure 15B:
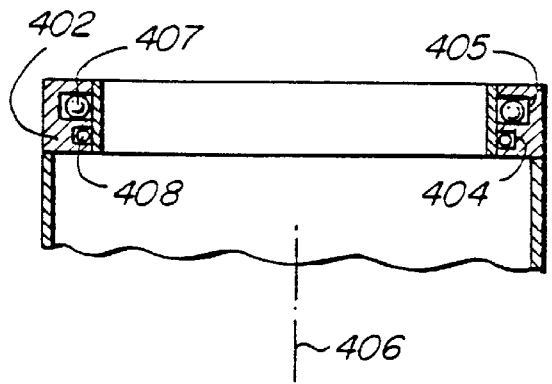
FIG. 15B is a diagrammatic view taken along 15B—15B of FIG. 15A.
Figure 15C:
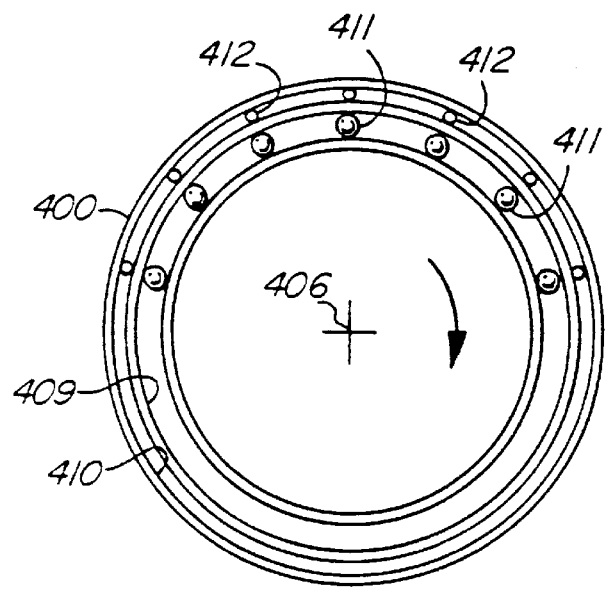
FIG. 15C is a diagrammatic view taken along 15C—15C of FIG. 15A.

Referring initially to FIG. 15B, the balancing device 402 may take the form of a plurality of races 404, 405 which extend circumferentially about axis 406 and are coaxial with axis 406. Movable weights in the form of balls 407, 408 are mounted in the races 404, 405 and serve to remove imbalances when the tub 400 is rotated.

Alternatively, the balancing device 402 may have races 409, 410 machined in a plane transverse to axis 406. The balls 411, 412 are movable in their respective races 409, 410 and, again, remove imbalances when the basket 400 rotates about axis 406.

Figure 16:
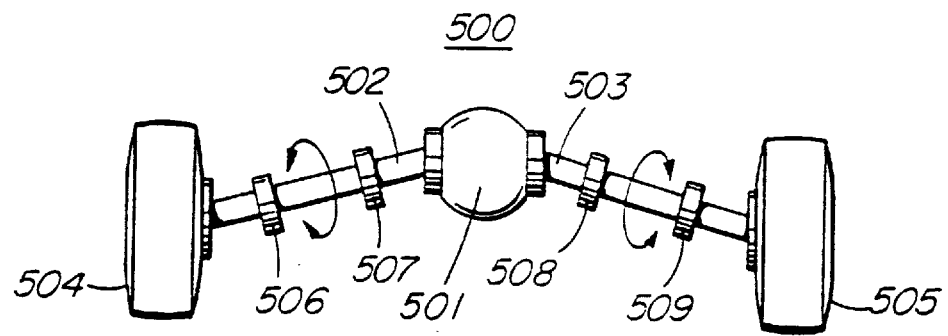
FIG. 16 is a diagrammatic view of the rear end drive axle and differential of a vehicle.

Yet a further embodiment of the invention is illustrated in FIG. 16 in which the rear end of a vehicle 500 is diagrammatically shown. A gear box or differential 501 has two axles 502, 503 extending outwardly from the gearbox 501 and connect to wheels 504, 505 which, of course, rotate with axles 502, 503 when the vehicle is under operation.

An imbalance may arise in the system. For example, the tires 504, 505 may become out of balance for various reasons including the fact that flats form on the tires. This is particularly true in formula race cars where the speeds of the cars vary greatly throughout a circuit and the tires are subjected to highly variable forces.

To correct the imbalance, balancing devices 506, 507, 508, 509 may be added to axles 502, 503, respectively, although only one per axle may be required. These would function in the same way as has been discussed as the axles 502, 503 rotate both axially and about gearbox 501 as is illustrated. In the event the rotation about gearbox 501 is not severe, it may be convenient to mount the balancing devices 508, 509 on the wheels 504, 505 rather than on the axles 502, 503 as is shown in FIG. 16.

Figure 17:
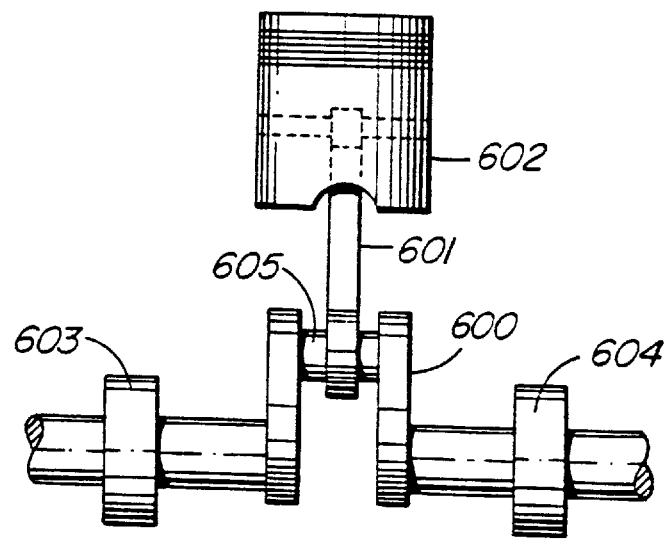
FIG. 17 is a view of a typical crankshaft which is connected to a piston of a compressor or internal combustion engine with balancing devices attached according to the invention.

Reference is now made to FIG. 17 which illustrates a crankshaft 600 having a crankpin 605 to which is attached piston rod 601 which is connected to piston 602. Piston 602 may be used, for example, in a compressor. Two balancing devices 603, 604 are connected to crankshaft 600 as illustrated. The operation of each is similar to the operations described and they serve to continuously remove imbalances in the system as previously set forth.

Figure 18:
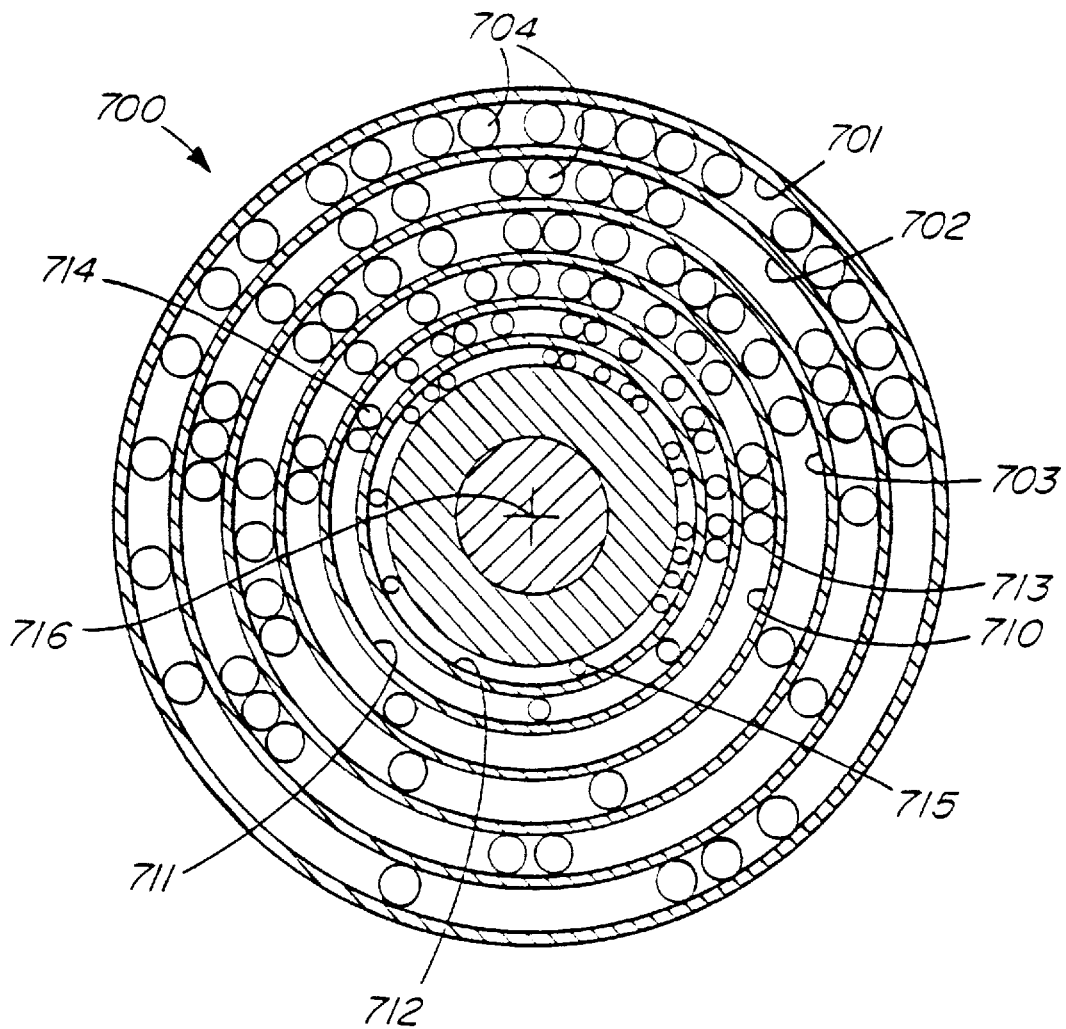
FIG. 18 is a side-sectional diagrammatic view of yet a further embodiment of the invention.

Reference is now made to FIG. 18 wherein six circumferential and concentric races are illustrated in the balancing device 700. In the three (3) outer races 701, 702, 703, the weights 704 are of identical diameters. In the inner races 710, 711, 712, the balls 713 in race 710 are of identical size while balls 714 in race 711 are of identical size and balls 715 in race 712 are of identical size, the sizes of the balls 713, 714 and 715 decreasing as the axis 716 is approached.

Figure 19A:
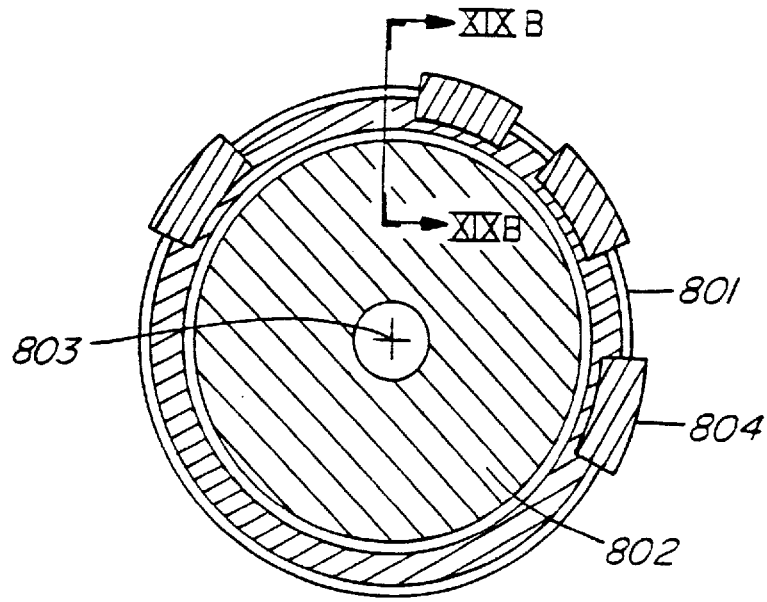
FIGS. 19A and 19B illustrate a circumferential I-beam arrangement according to a further aspect of the invention.
Figure 19B:
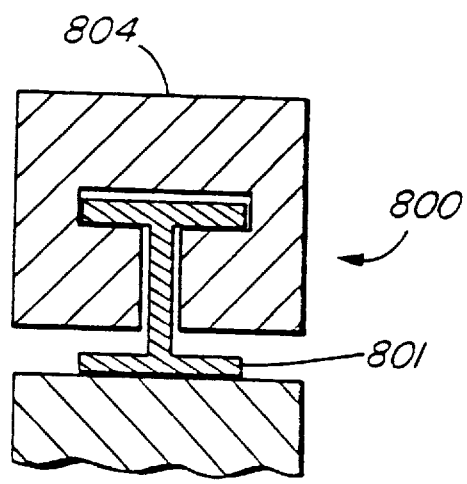

Reference is now made to FIGS. 19A and 19B wherein a further embodiment of the invention is illustrated which utilizes a circumferential I-beam and movable weight combination generally illustrated at 800. The I-beam 801 is mounted around the circumference of member 802 which rotates about axis 803 by welding or by attachment, for example, and a plurality of movable weights 804 are mounted on the I-beam 801 so as to be movable relative thereto. This embodiment of the invention has the advantage that it is inexpensive to manufacture and may be convenient in some applications such as where friction between the weights 804 and the I-beam 801 is not a large problem such as where the apparatus 800 is submerged in a liquid.

Figure 20:
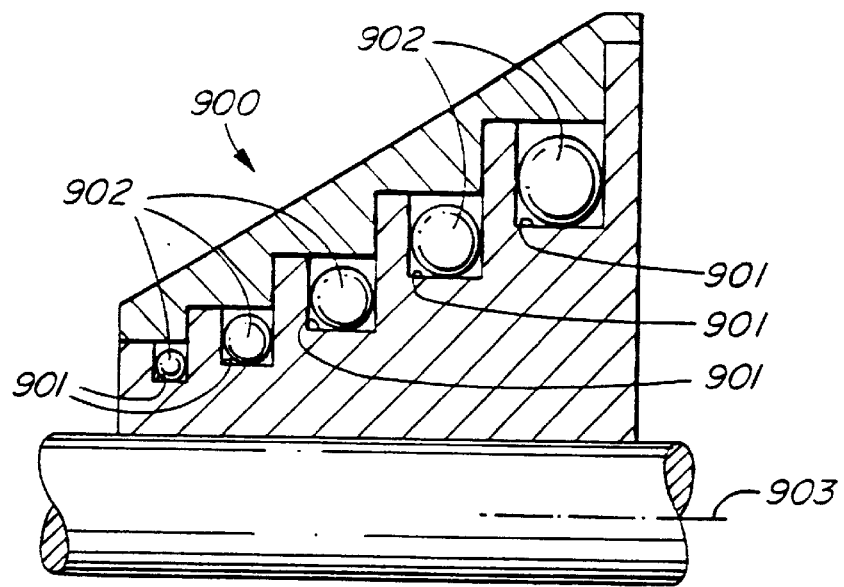
FIG. 20 illustrates a mounting arrangement according to a further aspect of the invention.

Reference is now made to FIG. 20 which illustrates an apparatus generally shown at 900 having a plurality of races 901 with movable weights 902 therein mounted about a member at increasing distances from the axis of rotation 903. While the weights 902 are shown as increasing in size as the distance of the weights 902 from the axis 903 increases, it will be understood that the sizes may remain constant or, indeed, the size may decrease as distance from the axis 903 increases.

Figure 21:
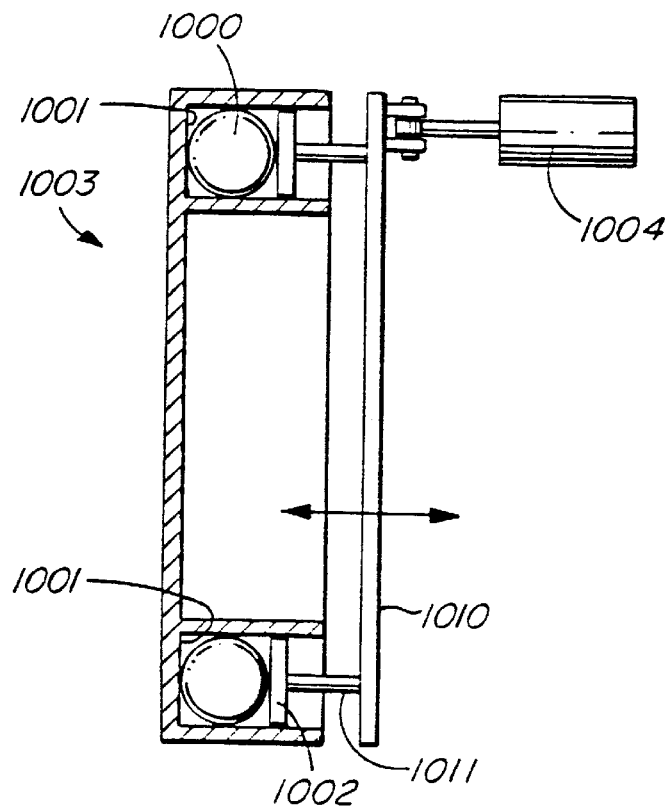
FIG. 21 is a diagrammatic isometric view of a weight locking apparatus according to a further aspect of the invention which is used to restrain the weights over a predetermined range of speeds.

Yet a further embodiment of the invention is illustrated in FIG. 21. In this embodiment, a plurality of weights or balls generally illustrated at 1000 is illustrated in a race 1001 in which, ordinarily, the weights 1000 are free to move. A circular disc 1002 is mounted about the periphery of the balancing apparatus generally illustrated at 1003 and this disc 1002 is axially movable as indicated by the arrows by the influence of a two way solenoid 1004. The disc 102 is operably connected to plate 1010 by pins 1011 located about its periphery.

The solenoid 1004 is connected to a tachometer (not shown) which measures the RPM count of the balancing apparatus 1003. When the tachometer reading reaches a certain and predetermined value, it initiates movement of the plate 1010 by activating solenoid 1004. When the solenoid 1004 moves leftwardly as viewed in FIG. 1, it will lock the weights or balls 1000 in position. Thereafter, when the tachometer reaches a second value, it will move the solenoid 1004 rightwardly which will move plate 1002 away from and release the balls or weights 1000. Such a configuration can be useful when it is desired to remove an imbalance over a certain speed range and, thereafter, to lock the balls 1000 in place after they assume a final balancing position to remove any imbalance which exists when the weights 1000 have been released.

Figure 22:
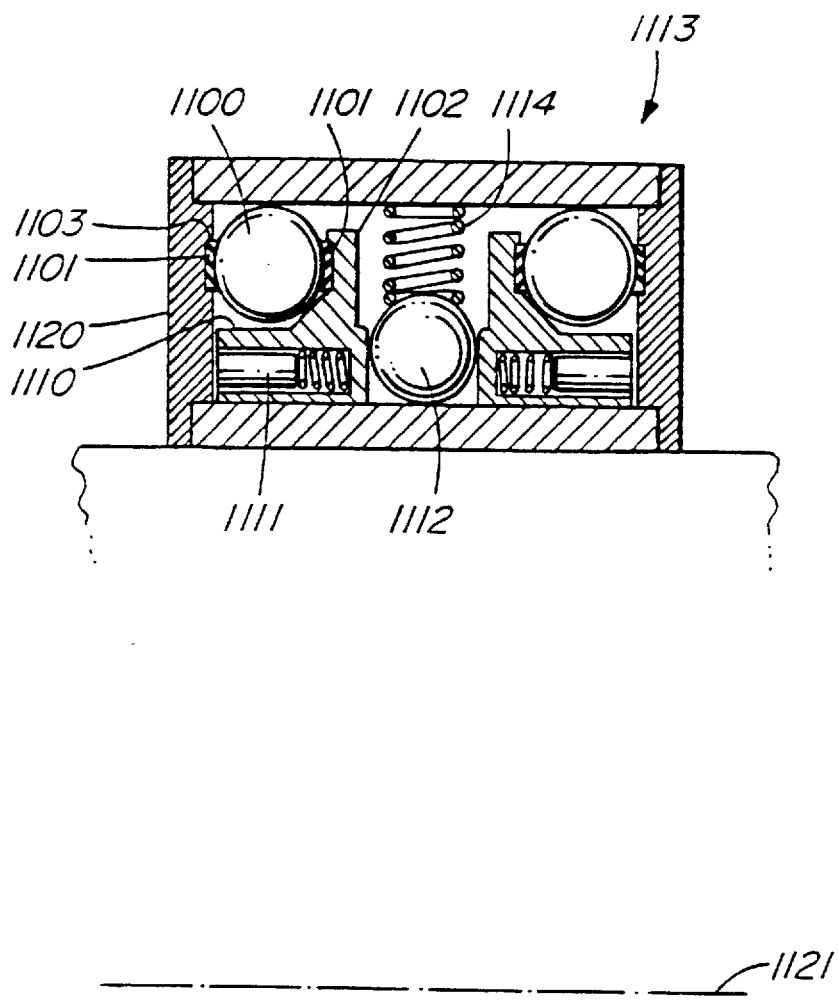
FIG. 22 is a side, diagrammatic cutaway view of a balancing device according to the invention in which the movable weights are first held in position until a predetermined speed of rotation is reached whereupon release then occurs.

Reference is now made to FIG. 22. In this embodiment, the weights or balls 1100 are held or "locked" in position by the force exerted between the balls 1100 and a material 1101, conveniently rubber, which is positioned within the groove 1103. One side of the rubber ball retaining material 1101 is mounted in a movable half-groove collar 1110. Collar 1110 has a plurality of spring mounted pins 1111 which tend to bias the collar 1110 into contact with control balls 1112 mounted intermittently about the circumference of the balancing apparatus 1113. Each of the control balls 1112 are biased to move inwardly by springs 1114.

In operation, when the balancing apparatus 1113 commences rotation, the balancing weights 1100 are securely held in position by the collar 1110 and the face plate 1120 until a predetermined rotation speed is reached. Thereafter, centrifugal force tending to move control balls 1112 outwardly against the force of springs 1114, will allow the balls 1112 to move outwardly relative to the axis of rotation 1121 until the collars 1110 are not restrained by being in contact with balls 1112. Collars 1110 will move towards each other thereby releasing the balancing balls 1100 and allowing them to move freely into a position wherein any imbalance is substantially reduced or removed. When the apparatus subsequently is lowered in rotation speed, balls 1112 will be forced inwardly by springs 1114, the collars 1110 will move outwardly to retain the balancing balls 1100 which will subsequently be held in position until the predetermined angular rotation speed is again substantially reached.

Figure 23:
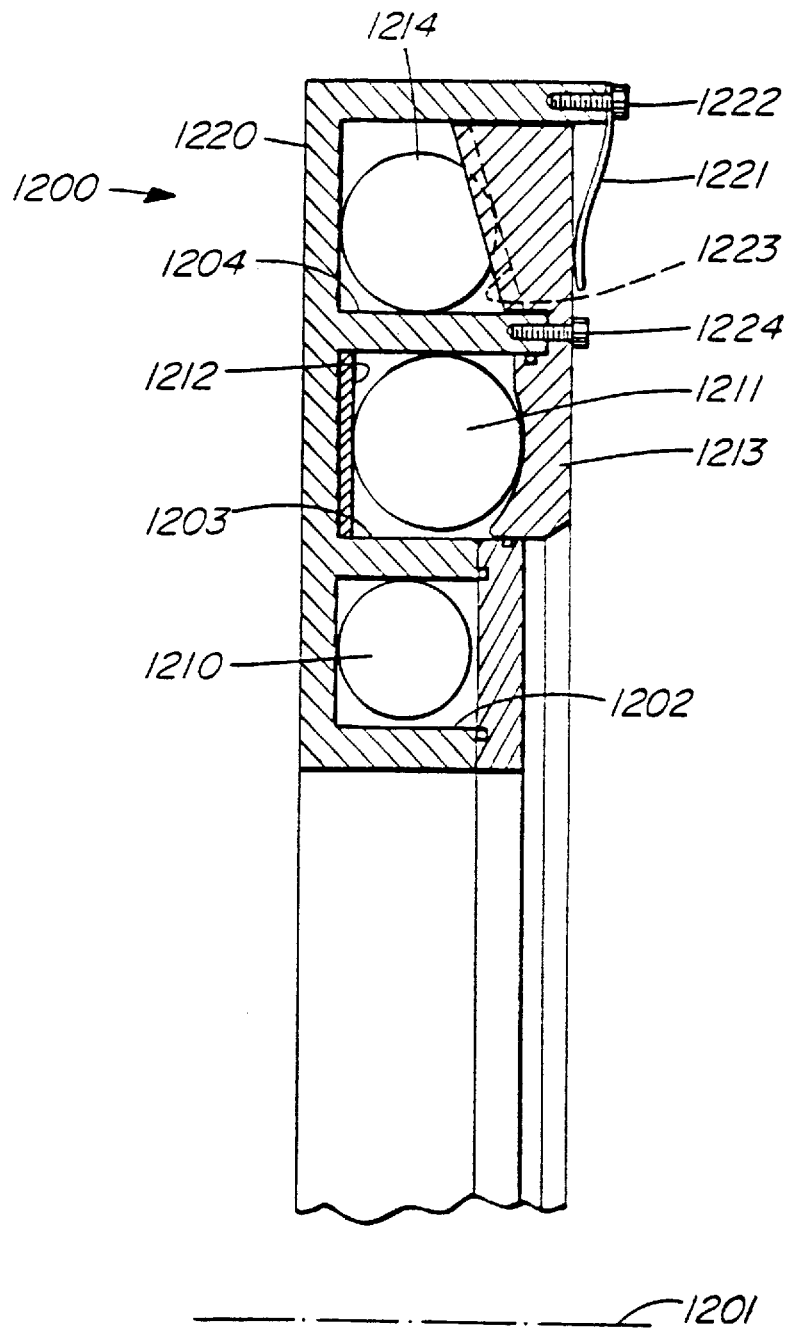
FIG. 23 is a diagrammatic cutaway view of a balancing device according to the invention which utilizes a plurality of free weights and a further set of weights released by control weights.

Reference is now made to FIG. 23 in which the balancing apparatus is generally illustrated at 1200 which rotates about axis 1201. Apparatus 1200 has three grooves or races 1202, 1203, 1204. A plurality of balancing balls 1210 are freely movable in groove 1202 and a second set of balancing balls 1211 are locked in the position shown in groove 1203 by a friction pad 1212 mounted in groove 1203 and an axially movable collar 1213. Likewise, a plurality of control balls 1214 are intermittently positioned around the circumference of groove 1204 between the outer face 1220 of balancing device 1200 and the inside wedge shaped surface of movable collar 1213. A flat spring 1221 connected to bolt 1222 maintains force on the collar 1213 tending to bias the collar 1213 leftwardly as viewed in FIG. 23.

In operation, as the balancing device 1200 is initially rotated, balancing balls 1210 are free to move within groove 1202 and will reach a position tending to remove any imbalance then existing. At a predetermined angular velocity, however, the control balls 1214 will tend to move outwardly with a force sufficient to move collar 1213 rightwardly against the force of flat spring 1221. As collar 1213 moves rightwardly, balls 1211 are released and, again, will quickly assume a configuration that tends to remove any imbalance in the apparatus. When the rotational speed of the balancing device 1200 is decreased, the collar 1213 will trap the balls 1211 in position which will be maintained until the rotational speed of the apparatus is again sufficient to move the control balls 1214 outwardly against the wedge shaped surface 1223 of movable collar 1213.

It is further contemplated in the embodiment of FIG. 23 that if it is desired to maintain the balancing balls 1211 in race 1203 in the locked position under all rotational circumstances, bolt 1224 is simply tightened which will remove all axial movement in collar 1213 until the operator desires otherwise and manually loosens bolt 1224.

Figure 24:
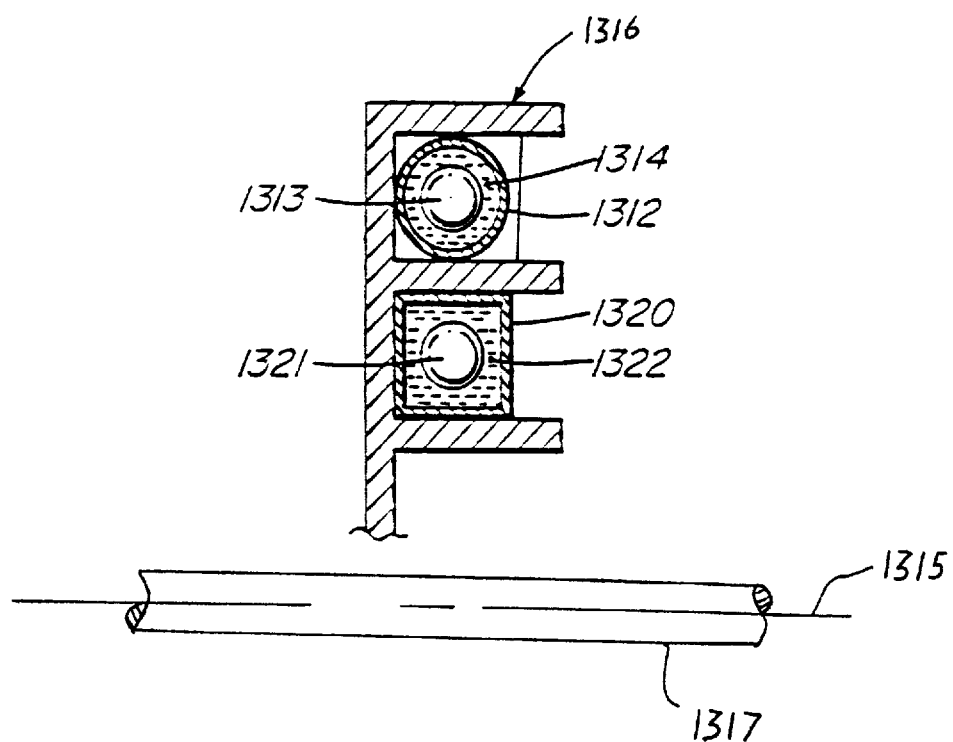
FIG. 24 is a diagrammatic cutaway view of two representative race configurations which will modify the behaviour of the weights during operation according to a further aspect of the invention.

Two representative configurations for the races are illustrated in FIG. 24. The first race 1312 is round as illustrated. A plurality of weights 1313 are positioned in the first race 1312. Fluid 1314 is also placed within the first race 1312.

The second race 1320 is of a square configuration with balls 1321 positioned within the race 1320. Fluid 1322 is also placed within the second race 1320. The balancing arrangement shown in FIG. 24 is adapted to rotate about the rotational axis 1315 of the rotatable shaft or element 1317. Thus, the races 1312, 1320 are disposed around a common axis that coincides with the rotational axis 1315 as seen in FIG. 24.

Other factors being equal, the shear forces exerted on the balls 1313 will be higher than the shear forces exerted on the balls 1321 by the fluid 1322 in race 1320 because of the closer average distance between the balls and the inner wall of the race. Thus, the movement of the balls 1321, 1313 could be staggered, for example, by placing fluid having the same viscosity in two races having different configurations. This would be intended to have the same affect as having fluids of different viscosities in races having the same configuration. As in the other embodiments, the embodiment shown in FIG. 24 includes an enclosing structure 1316 in which are disposed the races 1312, 1320. Also, as in the other embodiments, the balls 1313, 1321 in each race are disposed in a single annular row.

It will be understood that although the balls or weights in the races are shown to be of different sizes and weights, the densities of the materials may differ such that, for example, the balls or weights in one race may be the same size as the balls or weights in a second race although the weights are different because of the two different materials. Likewise, the weights may be of different sizes in the respective races but have the same weights, again because of the densities of the materials used.

Likewise, it is envisioned that a member having at least three pathways with the same width, with all of the balls or weights being of equal size, could be satisfactorily used in certain circumstances. The pathways would conveniently be concentric and taking the same form, for example, as the embodiment illustrated in FIG. 18 but with the three inner races or pathways removed.

While it is presently anticipated that the counterbalancing apparatus according to the invention be made from a metallic material, it is also contemplated that other materials may well be appropriate such as composite material structures and plastics or the like, depending on the operating conditions under which the counterbalancing apparatus is intended to function.

While specific embodiments of the invention have been described, such embodiments should be considered as illustrative of the invention only and not as limiting its scope as defined in accordance with the accompanying claims.

What is claimed is:

1. Arrangement for removing imbalance in a rotatable element, comprising an enclosing structure in which are disposed a plurality of races, said enclosing structure having a rotational axis, said plurality of races including a first annular race coaxially disposed around the rotational axis and a second annular race coaxially disposed around the rotational axis, a first plurality of weights movably positioned in the first race for movement within the first race during rotation, said first plurality of weights being disposed in a first single annular row within the first race, a second plurality of weights disposed in said second race for movement within the second race during rotation, said second plurality of weights being disposed in a second single annular row within the second race, said first race having a cross-sectional shape that is different from the cross-sectional shape of the second race.

2. Arrangement according to claim 1, wherein said first and second races are concentrically positioned with respect to the rotational axis, with the second race being located radially outwardly a greater distance from the rotational axis than the first race.

3. Arrangement according to claim 1, wherein said first race has a square cross-section.

4. Arrangement according to claim 1, wherein said second race has a round cross-section.

5. Arrangement according to claim 1, including a fluid in said first race and a fluid in said second race.

6. Arrangement according to claim 1, wherein said first race is disposed in a plane and said second race is disposed in said plane.

* * * * *